(12) United States Patent
Xu

(10) Patent No.: US 12,126,906 B2
(45) Date of Patent: Oct. 22, 2024

(54) LENS MODULE WITH ANTI-SHAKE AND FOCUS CONTROL AND ELECTRONIC DEVICE

(71) Applicant: AAC Optics (Nanning) Co., Ltd., Nanning (CN)

(72) Inventor: Tongming Xu, Shenzhen (CN)

(73) Assignee: AAC Optics (Nanning) Co., Ltd., Nanning (CN)

( * ) Notice: Subject to any disclaimer, the term of this patent is extended or adjusted under 35 U.S.C. 154(b) by 288 days.

(21) Appl. No.: 17/840,651

(22) Filed: Jun. 15, 2022

(65) Prior Publication Data

US 2023/0319411 A1 Oct. 5, 2023

(30) Foreign Application Priority Data

Mar. 30, 2022 (CN) .......................... 202220722409.4

(51) Int. Cl.
*H04N 23/68* (2023.01)
*G02B 7/09* (2021.01)
(Continued)

(52) U.S. Cl.
CPC ........... *H04N 23/687* (2023.01); *G03B 17/55* (2013.01); *H04N 23/00* (2023.01); *H04N 23/51* (2023.01); *H04N 23/52* (2023.01); *H04N 23/57* (2023.01); *G02B 7/09* (2013.01); *G02B 27/646* (2013.01); *G03B 2205/0007* (2013.01);
(Continued)

(58) Field of Classification Search
CPC ........ H04N 23/00; H04N 23/50; H04N 23/51; H04N 23/54; H04N 23/55; H04N 23/57; H04N 23/52; H04N 23/685; H04N 23/687; G03B 17/55; G03B 17/02; G03B 30/00; G03B 2217/00; G03B 2217/002; G03B 5/02; G03B 5/04; G03B 2205/0007; G03B 2205/0015; G03B 2205/0038; G03B 2205/0053; G03B 2205/0069; G02B 7/09; G02B 27/64; G02B 27/646

See application file for complete search history.

(56) References Cited

U.S. PATENT DOCUMENTS

| 2013/0107068 | A1* | 5/2013 | Kim | ........................ H04N 23/57 |
| | | | | 348/208.7 |
| 2019/0141248 | A1* | 5/2019 | Hubert | ..................... H05K 1/189 |
| 2019/0339542 | A1* | 11/2019 | Murakami | ............ H04N 23/687 |

* cited by examiner

*Primary Examiner* — Timothy J Henn
*Assistant Examiner* — Akshay Trehan
(74) *Attorney, Agent, or Firm* — W&G Law Group

(57) ABSTRACT

Embodiments of the present disclosure disclose a lens module and an electronic device. The lens module includes a base, an elastic suspension component and a lens component. The base is provided with an anti-shake control circuit board and a first conductive member. The elastic suspension component is connected to the base. The lens component is connected to the base through the elastic suspension component. The lens component includes an anti-shake bracket connected to the elastic suspension component, a focus control circuit board and a second conductive member arranged on the anti-shake bracket. The focus control circuit board is electrically connect to the anti-shake control board through the second conductive member, the elastic suspension component and the first conductive member in sequence. The lens module and the electronic device can avoid the poor condition of electrical signal transmission during the movement of the lens component due to the use of FPC.

14 Claims, 5 Drawing Sheets

(51) Int. Cl.
*G02B 27/64* (2006.01)
*G03B 17/55* (2021.01)
*H04N 23/00* (2023.01)
*H04N 23/51* (2023.01)
*H04N 23/52* (2023.01)
*H04N 23/54* (2023.01)
*H04N 23/55* (2023.01)
*H04N 23/57* (2023.01)

(52) U.S. Cl.
CPC ...... *G03B 2205/0053* (2013.01); *H04N 23/54* (2023.01); *H04N 23/55* (2023.01)

LENS MODULE WITH ANTI-SHAKE AND FOCUS CONTROL AND ELECTRONIC DEVICE

TECHNICAL FIELD

The present disclosure relates to the technical field of optical imaging, in particular to a lens module and an electronic device.

BACKGROUND

In recent years, with the continuous improvement of users' demand for camera, the lens module has been continuously updated to achieve higher and higher camera accuracy. Usually, the lens module is equipped with an automatic focus (AF) function and an optical image stabilization (OIS) function to ensure a definition of the camera. In the lens module equipped with the auto focus function and the optical image stabilization function, since the lens component needs to move in an accommodation space jointly enclosed by a base and a casing, how to transmit a signal of a focus control circuit to an external circuit without being affected is an important issue.

In some cases, the focus control circuit in the lens module is directly connected to an external circuit through a flexible printed circuit (FPC). However, some poor conditions will cause due to the FPC being pulled during the movement of the lens component.

SUMMARY

An object of the present disclosure is to provide a lens module and an electronic device, which can avoid the poor condition of electrical signal transmission during the movement of the lens component due to the use of the FPC.

In order to solve the above-mentioned technical problem, embodiments of the present disclosure provide a lens module, comprising a base, an elastic suspension component and a lens component, wherein the base is provided with an anti-shake control circuit board and a first conductive member; the elastic suspension component is connected to the base; the lens component is connected to the base through the elastic suspension component; the lens component comprises an anti-shake bracket connected to the elastic suspension component, a focus control circuit board arranged on the anti-shake bracket and a second conductive member arranged on the anti-shake bracket; and the focus control circuit board is electrically connected to the anti-shake control circuit board through the second conductive member, the elastic suspension component and the first conductive member in sequence.

Embodiments of the present disclosure further provide an electronic device, comprising the above-mentioned lens module.

In the lens module and the electronic device provided by the embodiments of the present disclosure, the elastic suspension component is introduced as a transmission channel for electrical signals, and the first conductive member arranged on the base and the second conductive member arranged on the anti-shake bracket are both electrically connected to the elastic suspension component. Besides, the first conductive member is further electrically connected to the anti-shake control circuit board, and the second conductive member is further electrically connected to the focus control circuit board, so that an electrical signal transmission channel is established among the focus control circuit board, the second conductive member, the elastic suspension component, the first conductive member and the anti-shake control circuit board. Therefore, an electrical signal transmission between a focus control circuit on the focus control circuit board with the anti-shake control circuit board is achieved through the transmission channel, and an electrical connection between the focus control circuit with an external circuit is realized through the anti-shake control circuit board. Since the elastic suspension component can better adapt to the pulling phenomenon that occurs during the movement of the lens component, the poor condition during the movement of the lens component due to the use of the FPC can be avoided.

In some embodiments, the anti-shake bracket has an object side and an image side oppositely arranged along a direction of an optical axis, wherein the first conductive member is embedded in the base and close to the object side, and the second conductive member is embedded in the anti-shake bracket and located on the image side. In this way, by embedding the first conductive member into the base and embedding the second conductive member into the anti-shake bracket, the stability of the first conductive member being fixed on the base and the stability of the second conductive member being fixed on the anti-shake bracket can be ensured.

In some embodiments, the focus control circuit board comprises a main body portion attached to the anti-shake bracket and two extending portions bent and extended from edges of the main body portion, and each of the extending portions extends to a surface of the anti-shake bracket on the image side, and is electrically connected to the second conductive member. In this way, the extending portions are extended to the surface of the anti-shake bracket on the image side, thereby facilitating the electrical connection between the focus control circuit board and the second conductive member.

In some embodiments, each of the extending portions is electrically connected to two of the second conductive members arranged on the image side, wherein each of the second conductive members comprises a flat portion attached to the extending portion and a plug-in portion integrally arranged with the flat portion, and the plug-in portion of each of the second conductive members is electrically connected to one of the first conductive members close to the object side after being plugged with the elastic suspension component. In this way, the elastic suspension component may be effectively adopted, and a transmission effect of electrical signals is ensured by arranging the plurality of second conductive members and the plurality of first conductive members.

In some embodiments, the lens module further comprises: a focus bracket for fixing a lens; and a focus coil wound on the focus bracket; wherein the focus bracket is connected to the anti-shake bracket through an elastic piece component, and the focus coil is electrically connected to the focus control circuit board through the elastic piece component. In this way, the electrical connection between the focus coil and the focus control circuit board may be achieved by connecting the anti-shake bracket and the elastic piece component of the focus bracket.

In some embodiments, the elastic piece component comprises a plurality of independently arranged elastic pieces, wherein the plurality of the elastic pieces are divided into two groups; one group of the elastic pieces are connected to the anti-shake bracket and the focus bracket on the object side, and the other group of the elastic pieces are connected to the anti-shake bracket and the focus bracket on the image side. In this way, a movable connection between the anti-shake bracket and the focus bracket may be realized from different sides of the anti-shake bracket, so as to ensure the stability of the focus bracket in movement.

In some embodiments, the focus bracket is provided with a first terminal and a second terminal electrically connected to the focus coil, wherein the first terminal is protruded from a surface of the focus bracket on the object side, and the second terminal is protruded from the surface of the focus bracket on the image side; the first terminal and the second terminal are respectively arranged through one of the elastic pieces and are electrically connected to the through elastic pieces. In this way, the focus coil is leaded out through the first terminal and the second terminal, thereby facilitating the electrical connection between the focus coil and the focus control circuit board.

In some embodiments, the anti-shake bracket is provided with a third conductive member, and the third conductive member comprises a connecting portion attached to the elastic piece and an extension portion bent and extended from the connecting portion toward the image side; the extension portion is electrically connected to the focus control circuit board, and the elastic piece electrically connected to the first terminal is electrically connected to the focus control circuit board through the third conductive member. In this way, the third conductive member is provided, which is beneficial to realize the electrical connection between the first terminal and the focus control circuit board.

In some embodiments, each of the elastic pieces comprises two attaching portions and a suspension portion connecting the two attaching portions; the two attaching portions of each of the elastic pieces are respectively attached to one of the anti-shake bracket and the focus bracket, and the suspension portion of each of the elastic pieces is bent and extended between the two attaching portions. In this way, the deformation amount required by the focus bracket during the movement for focusing may be satisfied by the deformation characteristics of the suspension portion.

Figure 1:
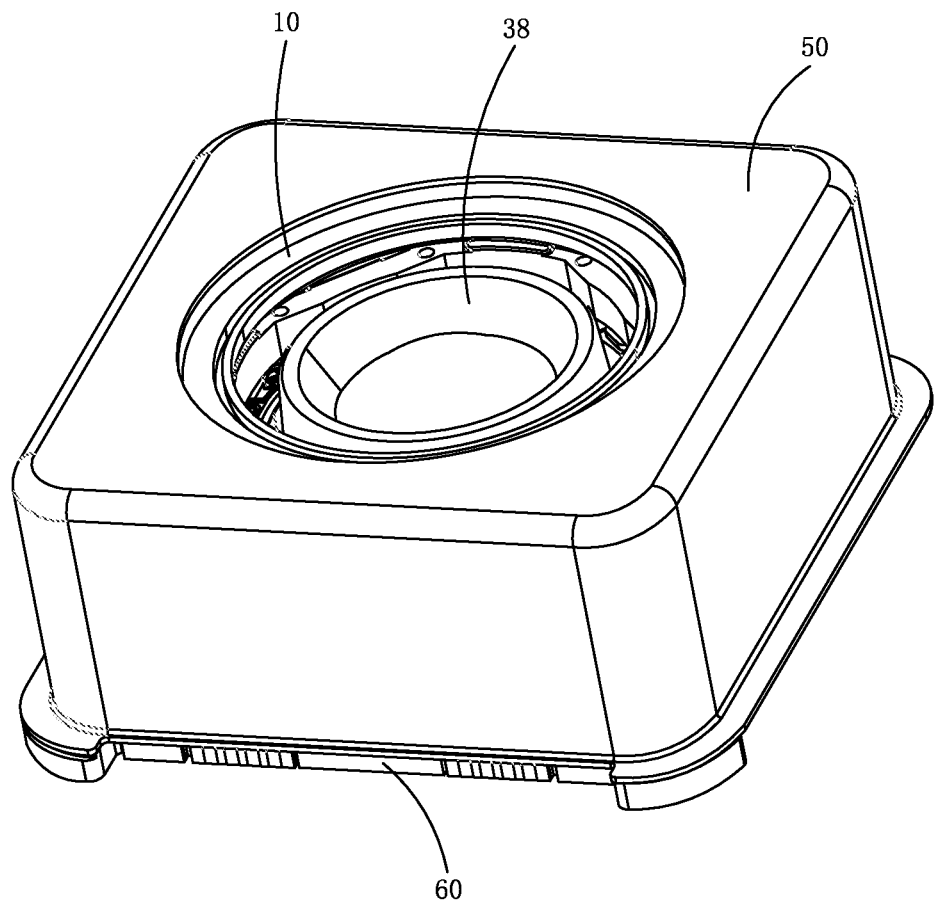
FIG. 1 is a three-dimensional diagram of a lens module according to an embodiment of the present disclosure.

DESCRIPTION OF REFERENCE NUMERALS 10, base; 11, anti-shake control circuit board; 111, first portion; 112, second portion; 12, first conductive portion; 20, elastic suspension component; 21, elastic member; 30, lens component; 31, anti-shake bracket; 311, object side; 312, image side; 32, focus control circuit board; 321, main body portion; 322, extending portion; 33, second conductive member; 331, flat portion; 332, plug-in portion; 34, focus bracket; 341, first terminal; 342, second terminal; 35, focus coil; 36, third conductive member; 361, connecting portion; 362, extension portion; 37, magnetic steel; 38, lens; 40, elastic piece component; 41, elastic piece; 411, attaching portion; 412, suspension portion; 50, casing; and 60, base.

DETAILED DESCRIPTION OF THE EMBODIMENTS

In order to make the object, technical solutions and advantages of the embodiments of the present disclosure more clear, various embodiments of the present disclosure will be described in detail below with reference to the accompanying drawings. However, those of ordinary skill in the art can understand that, in the various embodiments of the present disclosure, many technical details are provided for readers to better understand the present disclosure. However, even without these technical details and various changes and modifications based on the following embodiments, the technical solutions claimed by the present disclosure can be realized.

A high-performance lens modules is generally equipped with an automatic focus function and an optical image stabilization function. When the lens module is auto-focusing, it is necessary to move the lens along a direction of an optical axis in an accommodation space jointly enclosed by a base and a casing. The optical image stabilization function is to use a movable portion to compensate for the vibration of the light path, thereby ensuring a definition of the captured photos. In practical situations, an anti-shake bracket in a lens component may be movably arranged in the accommodating space jointly enclosed by the base and the casing. Therefore, the optical image stabilization function is achieved by controlling the image stabilization bracket to move along the vertical direction of the optical axis of the lens.

In the lens module, when the lens component moves, the circuit board where the focus control circuit is located is driven to move together. Therefore, how to ensure a normal transmission of electrical signals between the focus control circuit and an external circuit during the movement of the lens component is an important issue.

In some cases, the focus control circuit is connected to the external circuit through the FPC, and the flexibility of the FPC itself enables the FPC to deform to a certain extent during the movement of the lens component. However, in the process of practical application, some poor conditions will still cause due to the FPC being pulled during the movement of the lens component.

Based on this, an embodiment of the present disclosure provides a lens module, in which electrical signals are transmitted through a suspension wire suspending the lens component in the lens module, thereby realizing the transmission of the electrical signals between the anti-shake control circuit with the focus control circuit, so that the electrical signals can be normally transmitted to an external circuit through the anti-shake control circuit board.

In the lens module, the suspension wire is a component for connecting the lens component with the base, and the lens component is suspended on the base through a plurality of suspension wires. Through the elastic deformation characteristics of the suspension wire itself, the lens component can be moved in the accommodating space jointly enclosed by the base and the casing.

When the suspension wire is adopted to transmit the electrical signals, since the suspension wire is a component for realizing the movable connection between the lens component and the base, it can adapt to the pulling phenomenon that exists when the lens component moves. Thus, the poor condition of electrical signal transmission during the movement of the lens component due to the use of FPC can be avoided.

The structure of the lens module provided by the embodiment of the present disclosure will be described as follows with reference to FIG. 1 and FIG. 2.

Figure 2:
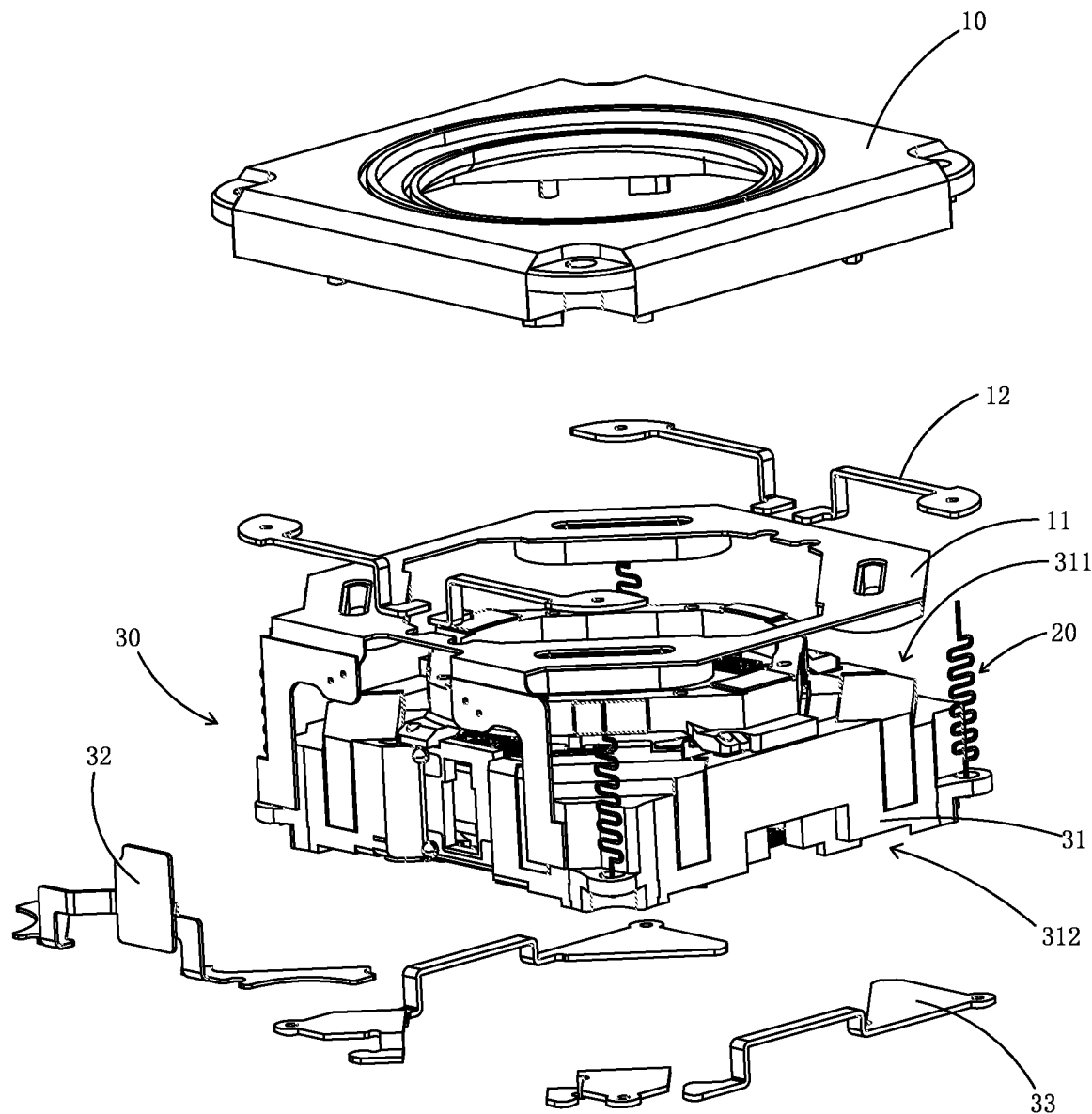
FIG. 2 is a diagram of an assembly structure of a base and a lens component in the lens module according to an embodiment of the present disclosure.

As shown in FIG. 1 and FIG. 2, the lens module provided by the embodiment of the present disclosure includes a base 10, an elastic suspension component 20 and a lens component 30. The base 10 is provided with an anti-shake control circuit board 11 and a first conductive member 12. The elastic suspension component 20 is connected to the base 10. The lens component 30 is connected to the base 10 through the elastic suspension component 20. The lens component 30 includes an anti-shake bracket 31 connected to the elastic suspension component 20, a focus control circuit board 32 arranged on the anti-shake bracket 31 and a second conductive member 33 arranged on the anti-shake bracket 31. The focus control circuit board 32 is electrically connected to the anti-shake control circuit board 11 through the second conductive member 33, the elastic suspension component 20, and the first conductive member 12 in sequence.

The base 10 is a component configured to provide a connection basis for the lens component 30 in the lens module. The base 10 may be arranged in the casing 50 of the lens module. The casing 50 of the lens module and the base 60 together form an accommodation space. The base 10 and the lens component 30 connected to the base 10 through the elastic suspension component 20 are located in the accommodation space. The anti-shake control circuit board 11 is a circuit board arranged on the base 10 for outputting an anti-shake control signal. The first conductive member 12 is arranged on the base 10, which is a component configured to establish an electrical connection between the anti-shake control circuit board 11 with the elastic suspension component 20.

The elastic suspension component 20 is a component that includes a plurality of elastic members 21 and serves as a connection between the base 10 and the lens component 30. Based on the elastic deformation characteristics of the elastic suspension component 20, the lens component 30 may be driven by adopting a certain driving form moves relative to the base 10 to realize the anti-shake function. The elastic member 21 may be a wire-shaped or sheet-shaped elastic member 21.

The lens component 30 is a component for realizing optical imaging and controlling the imaging quality in the lens module, and the anti-shake bracket 31 in the lens component 30 may be driven to realize the anti-shake function. The focus control circuit board 32 arranged on the anti-shake bracket 31 in the lens component 30 is configured to output a control signal to control a movement of the lens 38 to realize the automatic focus function. The second conductive member 33 is arranged on the anti-shake bracket 31, which is used to establish an electrical connection between the focus control circuit board 32 and the elastic suspension component 20.

In the lens module provided by the embodiment of the present disclosure, the elastic suspension component 20 is introduced as a transmission channel for the electrical signals. The first conductive member 12 arranged on the base 10 and the second conductive member 33 arranged on the anti-shake bracket 31 are both electrically connected to the elastic suspension component 20. Besides, the first conductive member 12 is further electrically connected to the anti-shake control circuit board 11, and the second conductive member 33 is further electrically connected to the focus control circuit board 32, so that an electrical signal transmission channel is established among the focus control circuit board 32, the second conductive member 33, the elastic suspension component 20, the first conductive member 12 and the anti-shake control circuit board 11. Therefore, the an electrical signal transmission may be established between the focus control circuit on the focus control circuit board 32 with the anti-shake control circuit board 11 through the transmission channel, and an electrical connection between the focus control circuit with an external circuit through the anti-shake control circuit board 11. Since the elastic suspension component 20 can better adapt to the pulling phenomenon that occurs when the lens component 30 moves, the poor condition that occurs during the movement of the lens component 30 due to the use of FPC can be avoided.

The anti-shake bracket 31 has an object side 311 and an image side 312 oppositely arranged along a direction of an optical axis. The first conductive member 12 is embedded in the base 10 and is close to the object side 311 of the anti-shake bracket 31, and the second conductive member 33 is embedded in the anti-shake bracket 31 and located on the image side 312 of the anti-shake bracket 31.

The object side 311 of the anti-shake bracket 31 refers to a side where a subject to be captured is located, and the image side 312 of the anti-shake bracket 31 refers to a side where the subject to be captured forms an image. As shown in FIG. 2, a side of the anti-shake bracket 31 close to the base 10 is the object side 311, and a side of the anti-shake bracket 31 away from the base 11 is the image side 312.

The position of the first conductive member 12 is arranged close to the object side 311 of the anti-shake bracket 31, that is, close to the position of the anti-shake control circuit board 11. The first conductive member 12 is arranged in a plate shape, which may be arranged into a plurality of different plate-shaped parts according to a specific structure of the base 10, and each plate-shaped part may be integrally formed. In order to ensure the stability of the first conductive member 12 being fixed on the base 10, the first conductive member 12 may be embedded in the base 10, that is, the first conductive member 12 is integrally embedded in the base 10. Besides, a part of a surface of the first conductive member 12 is attached to the anti-shake control circuit board 11, and a part of the first conductive member 12 that is electrically connected to the elastic suspension component 20 is provided with a through hole, so that the first conductive member 12 can be sleeved on the suspension wire in the elastic suspension component 20 connected to the base 10. In addition, the first conductive member 12 may be fixed to the suspension wire by welding, so as to ensure the effect of electrical connection with the suspension wire.

The second conductive member 33 is located on the image side 312 of the anti-shake bracket 31, that is, close to a position where the elastic suspension component 20 is connected to the anti-shake bracket 31. The second conductive member 33 is arranged in a plate shape, which may be arranged into a plurality of different plate-shaped parts according to the specific structure of the anti-shake bracket 31, and each plate-shaped part may be integrally formed. In order to ensure the stability of the second conductive member 33 being fixed on the anti-shake bracket 31, the second conductive member 33 may be embedded in the anti-shake bracket 31, that is, the second conductive member 33 is partially embedded in the anti-shake bracket 31. Besides, a part of a surface of the second conductive member 33 is attached to the focus control circuit board 32, and a part of the second conductive member 33 that is electrically connected to the elastic suspension component 20 is provided with a through hole, so that the second conductive member 33 can be sleeved on the suspension wire in the elastic suspension component 20 connected to the shaker bracket 31. In addition, the second conductive member 33 may be fixed to the suspension wire by welding, so as to ensure the effect of electrical connection with the suspension wire.

In other embodiments, the first conductive member 12 may also be fixed on the surface of the base 10, and the second conductive member 33 may be fixed on the surface of the anti-shake bracket 31. Alternatively, a part of the first conductive member 12 is embedded in the base 10, and a part of the second conductive member 33 is embedded in the conductive bracket, so that the first conductive member 12 can be effectively fixed on the base 10 and the second conductive member 33 can be effectively fixed on the anti-shake bracket 31.

In some cases, the focus control circuit board 32 may include a main body portion 321 attached to the anti-shake bracket 31 and two extending portions 322 bent and extended from edges of the main body portion 321. Each extending portion 322 extends to the surface of the anti-shake bracket 31 on the image side 312 and is electrically connected to the second conductive member 33.

The main body portion 321 and the two extending portions 322 are different portions of the focus control circuit board 32. The main body portion 321 may be provided with devices for realizing a control function and detection elements (such as Hall elements) for detecting the movement of the lens 38. Each of the extending portions 322 may facilitate the electrical connection between the focus control circuit board 32 with the second conductive member 33. The main body portion 321 is fixed on the anti-shake bracket 31. In order to avoid the devices on the main body portion 321 and realize the detection function of the detection element on the main body portion 321, an avoidance hole may be provided on the anti-shake bracket 31 at a position where the main body portion 321 is fixed. The two extending portions 322 are respectively bent and extended from an edge of the body portion 321 to the image side 312 of the anti-shake bracket 31, and are electrically connected to the second conductive member 33 after extending to the surface of the anti-shake bracket 31 on the image side 312. Therefore, the electrical signals are transmitted to the second conductive member 33, and the electrical signals of the external circuit are received from the second conductive member 33.

Figure 3:
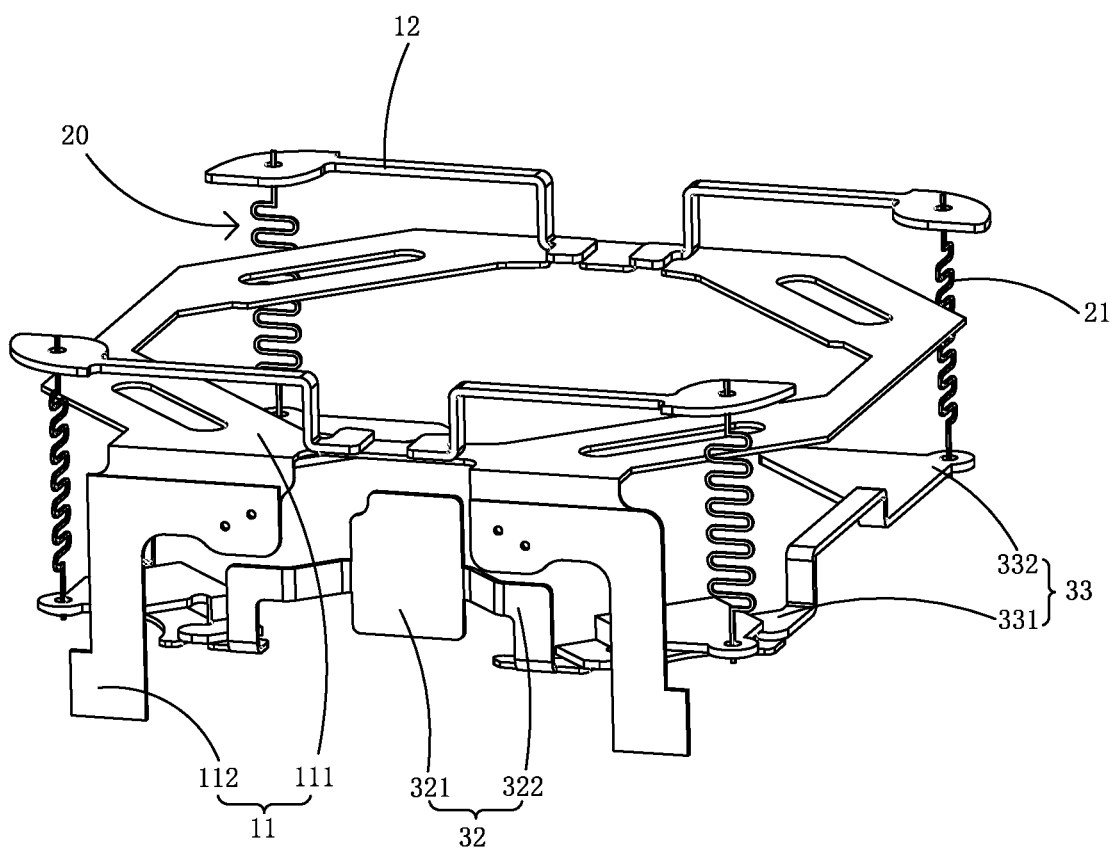
FIG. 3 is a structural diagram illustrating an electrical connection between a focus control circuit board and an anti-shake control circuit board in the lens module according to an embodiment of the present disclosure.

As shown in FIG. 3, each extending portion 322 is electrically connected to two of the second conductive members 33 arranged on the image side 312 of the anti-shake bracket 31. Each second conductive member 33 includes a flat portion 331 attached to the extending portion 322 and a plug-in portion 332 integrally provided with the flat portion 331. The plug-in portion 332 of each second conductive member 33 is electrically connected to one of the first conductive member 12 close to the object side 311 of the anti-shake bracket 31 after being plugged into the elastic suspension component 20.

It should be noted that the suspension wires included in the elastic suspension component 20 are arranged around the anti-shake bracket 31. In order to effectively transmit the electrical signals to the anti-shake control circuit board 11 through the elastic suspension component 20, an electrical connection may be established between each extending portion 322 and two of the suspension wires in the elastic suspension component 20. Therefore, the two extending portions 322 may be symmetrically arranged with respect to a geometric center of the main body portion 321, that is, the parts of the two extending portions 322 connected to the main body portion 321 extend in two opposite directions respectively. Therefore, each extending portion 322 extends to the surface of the anti-shake bracket 31 located on the image side 312, so as to facilitate the electrical connection with two adjacent suspension wires in the elastic suspension component 20.

In addition, the lens component 30 further includes a focus bracket 34 for fixing the lens 38 and a focus coil 35 wound on the focus bracket 34. The focus bracket 34 is connected to the anti-shake bracket 31 through the elastic piece component 40, and the focus coil 35 is electrically connected to the focus control circuit board 32 through the elastic piece component 40.

Figure 4:
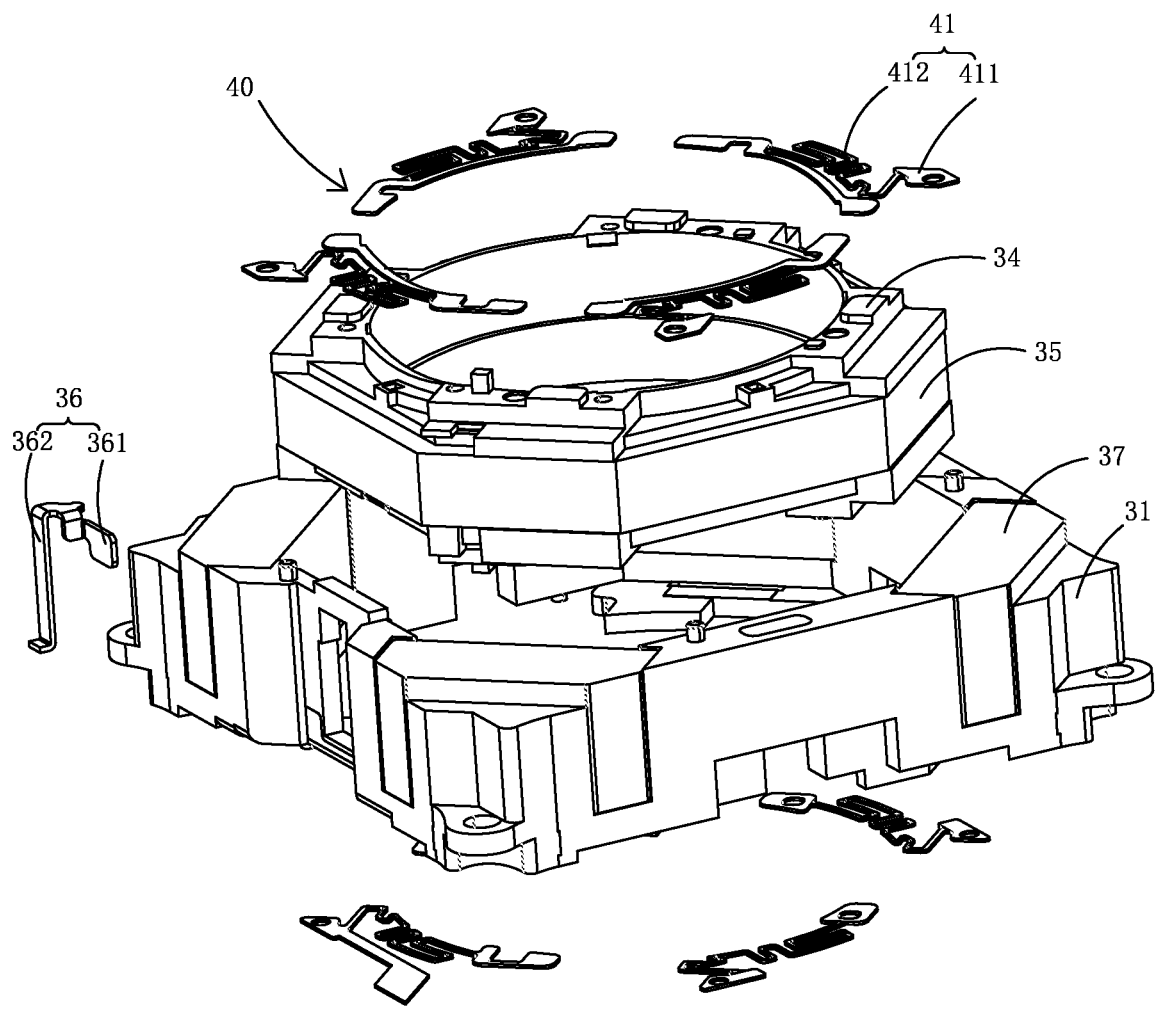
FIG. 4 is a diagram of an assembly structure of an anti-shake bracket and a focus bracket in the lens module according to an embodiment of the present disclosure.
Figure 5:
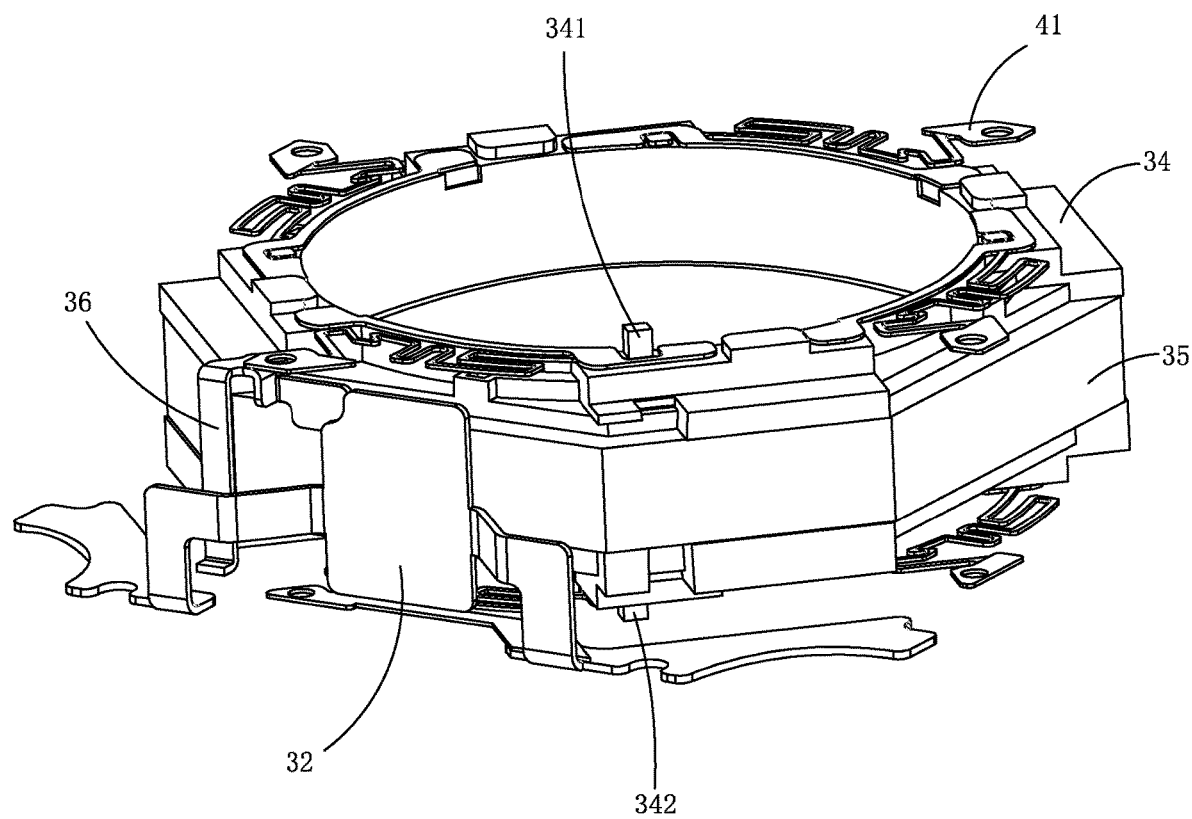
FIG. 5 is a structural diagram illustrating an electrical connection between the focus control circuit board and a focus coil in the lens module according to an embodiment of the present disclosure.

As shown in FIG. 4 and FIG. 5, the focus coil 35 is integrally wound around a periphery of the focus bracket 34. The focus coil 35 cooperates with the magnetic steel 37 provided on the anti-shake bracket 31 after power-on, so as to drive the focus bracket 34 and the lens 38 fixed on the focus bracket 34 to move along the direction of the optical axis by the electromagnetic force, thereby realizing the automatic focus function. In order to enable the focus control circuit board 32 to transmit the electrical signals to the focus coil 35, the electrical connection between the focus control circuit board 32 and the focus coil 35 may be achieved by connecting the anti-shake bracket 31 and the elastic piece component 40 of the focus bracket 34. That is, when connecting the anti-shake bracket 31 and the focus bracket 34, the elastic piece component 40 also plays the role of electrically connecting the focus coil 35 and the focus control circuit board 32.

The elastic piece component 40 may include a plurality of independently arranged elastic pieces 41, and the plurality of elastic pieces 41 are divided into two groups. One group of elastic pieces 41 are connected to the anti-shake bracket 31 and the focus bracket 34 on the object side 311 of the anti-shake bracket 31, and the other group of elastic pieces 41 are connected to the anti-shake bracket 31 and the focus bracket 34 on the image side 312 of the anti-shake bracket 31.

The two groups of elastic pieces 41 may be connected to the focus bracket 34 from the object side 311 and the image side 312 of the anti-shake bracket 31 respectively. Therefore, a relatively stable state of the focus bracket 34 during the focus movement process can be ensured while ensuring the connection effect between the anti-shake bracket 31 and the focus bracket 34, and there will be no sudden change in position. As shown in FIG. 4, in some cases, four elastic pieces 41 may be used as a group, and the two groups of elastic pieces 41 may be fixed on the object side 311 and the image side 312 of the anti-shake bracket 31 in an one-to-one manner. Since the positions of the respective elastic pieces 41 are relatively corresponding, in the process of controlling the movement of the focus bracket 34, the forces received by the focus bracket 34 from the plurality of elastic pieces 41 are relatively balanced, ensuring the stability of the focus bracket 34 during the movement.

In addition, the focus bracket 34 is provided with a first terminal 341 and a second terminal 342 respectively electrically connected to the focus coil 35. The first terminal 341 is protruded from a surface of the focus bracket 34 on the object side 311, and the second terminal 342 is protruded from a surface of the focus bracket 34 on the image side 312.

The first terminal 341 and the second terminal 342 are respectively arranged through one of the elastic pieces 41 and are electrically connected to the through elastic pieces 41.

The first terminal 341 and the second terminal 342 are parts of the focus bracket 34 that lead out the focus coil 35, which facilitates the electrical connection between the focus coil 35 and the focus control circuit board 32 on the anti-shake bracket 31.

As shown in FIG. 4, the anti-shake bracket 31 is provided with a third conductive member 36. The third conductive member 36 includes a connecting portion 361 attached to the elastic piece 41 and bent from the connecting portion 361 toward the image side 312 of the anti-shake bracket 31. The extension portion 362 is electrically connected to the focus control circuit board 32, and the elastic piece 41 electrically connected to the first terminal 341 is electrically connected to the focus control circuit board 32 through the third conductive member 36.

The third conductive member 36 is arranged in a plate shape, which may be arranged into a plurality of different plate-shaped parts according to the specific structure of the anti-shake bracket 31, and each plate-shaped part may be integrally formed. In order to ensure the stability of the third conductive member 36 fixed on the anti-shake bracket 31, the third conductive member 36 may be embedded in the anti-shake bracket 31, that is, the third conductive member 36 is partially or entirely embedded in the anti-shake bracket 31. The connecting portion 361 and the extending portion 362 are two parts of the third conductive member 36, and the surface of the connecting portion 361 is attached to the elastic piece 41 to realize electrical connection with the elastic piece 41. The extension portion 362 is configured to realize the electrical connection between the third conductive member 36 with the focus control circuit board 32. An edge of the extension portion 362 may be partially bent. A part of the surface of the extension part 362 may be attached to the extension part 322 of the focus control circuit board 32 on the image side 312 of the anti-shake bracket 31, so as to ensure the electrical signal transmission effect between the third conductive member 36 and the focus control circuit board 32.

In some embodiments of the present disclosure, each elastic piece 41 may include two attaching portions 411 and a suspension portion 412 connected to the two attaching portions 411. The two attaching portions 411 of each elastic piece 41 are respectively attached to one of the anti-shake bracket 31 and the focus bracket 34. The suspension portion 412 of each elastic piece 41 is bent and extended between the two attaching portions 411.

The attaching portions 411 can ensure an attaching area when connecting to one of the anti-shake bracket 31 and the focus bracket 34, so as to ensure the stability when connecting to one of the anti-shake bracket 31 and the focus bracket 34. The suspension portion 412 is an elastically deformed portion of the elastic piece 41. The suspension portion 412 is suspended between the anti-shake bracket 31 and the focus bracket 34, so as to ensure that the focus bracket 34 can move relative to the anti-shake bracket 31 after the two attaching portions 411 are respectively attached to one of the anti-shake bracket 31 and the focus bracket 34. As shown in FIG. 4, the suspension portion 412 of each elastic piece 41 is bent and extended between the two attaching portions 411. Besides, the suspension portion 412 may be bent between the two attaching portions 411 multiple times, so as to ensure that the suspension portion 412 of each elastic piece 41 has sufficient deformation characteristics to meet the deformation amount required by the focus bracket 34 during the focus movement.

As shown in FIG. 3, the anti-shake control circuit board 11 may include a first portion 111 attached to the base 10 and two second portions 112 bent and extended from the first portion 111 toward the image side 312 of the anti-shake bracket 31, and the two second portions 112 are configured to electrically connected to an external circuit.

The first portion 111 of the anti-shake control circuit board 11 is integrally arranged in the base 10, and is connected to a plurality of anti-shake coils 13. Each anti-shake coil 13 corresponds to a position of each magnetic steel 37 on the anti-shake bracket 31 one-to-one. After the anti-shake control circuit board 11 outputs the electrical signals to each anti-shake coil 13, the anti-shake bracket 31 may be driven by an electromagnetic force to move in a direction perpendicular to the direction of the optical axis, thereby realizing the optical anti-shake function.

In addition, a detection circuit board with a Hall element may further be provided on the base 60 of the lens module, and the Hall element on the detection circuit board may be arranged in a position facing the magnet steel 37 on the anti-shake bracket 31. Through the detection circuit board, the position of the anti-shake bracket 31 may be detected in real time, so as to determine whether the anti-shake bracket 31 has moved to the corresponding position after acquiring the exact position of the anti-shake bracket 31.

Embodiments of the present disclosure further provide an electronic device, including the lens module in the above-mention embodiments.

The electronic device may be, but is not limited to, an electronic product with a camera function, such as a mobile phone, a tablet, and a notebook computer.

Those skilled in the art can understand that the above-mentioned embodiments are specific embodiments for realizing the present disclosure. In practical applications, various changes may be made in form and details without departing from the spirit and scope of the present disclosure.

What is claimed is:

1. A lens module, comprising:
   a base provided with an anti-shake control circuit board and a first conductive member;
   an elastic suspension component connected to the base; and
   a lens component connected to the base through the elastic suspension component, comprising:
   an anti-shake bracket connected to the elastic suspension component;
   a focus control circuit board arranged on the anti-shake bracket; and
   a second conductive member arranged on the anti-shake bracket;
   wherein the focus control circuit board is electrically connected to the anti-shake control circuit board through the second conductive member, the elastic suspension component and the first conductive member in sequence;
   wherein the anti-shake bracket has an object side and an image side oppositely arranged along a direction of an optical axis, wherein the first conductive member is embedded in the base and close to the object side, and the second conductive member is embedded in the anti-shake bracket and located on the image side;
   wherein the focus control circuit board comprises a main body portion attached to the anti-shake bracket and two extending portions bent and extended from edges of the main body portion, and each of the extending portions extends to a surface of the anti-shake bracket on the image side, and is electrically connected to the second conductive member.

2. The lens module of claim 1, wherein each of the extending portions is electrically connected to two of the second conductive members arranged on the image side, wherein each of the second conductive members comprises a flat portion attached to the extending portion and a plug-in portion integrally arranged with the flat portion, and the plug-in portion of each of the second conductive members is electrically connected to one of the first conductive members close to the object side after being plugged with the elastic suspension component.

3. The lens module of claim 1, further comprising:
a focus bracket for fixing a lens; and
a focus coil wound on the focus bracket;
wherein the focus bracket is connected to the anti-shake bracket through an elastic piece component, and the focus coil is electrically connected to the focus control circuit board through the elastic piece component.

4. The lens module of claim 3, wherein the elastic piece component comprises a plurality of independently arranged elastic pieces, wherein the plurality of the elastic pieces are divided into two groups; one group of the elastic pieces are connected to the anti-shake bracket and the focus bracket on the object side, and the other group of the elastic pieces are connected to the anti-shake bracket and the focus bracket on the image side.

5. The lens module of claim 4, wherein the focus bracket is provided with a first terminal and a second terminal both electrically connected to the focus coil, wherein the first terminal is protruded from a surface of the focus bracket on the object side, and the second terminal is protruded from the surface of the focus bracket on the image side; the first terminal and the second terminal are respectively arranged through one of the elastic pieces and are electrically connected to the through elastic pieces.

6. The lens module of claim 5, wherein the anti-shake bracket is provided with a third conductive member, and the third conductive member comprises a connecting portion attached to the elastic piece and an extension portion bent and extended from the connecting portion toward the image side; the extension portion is electrically connected to the focus control circuit board, and the elastic piece electrically connected to the first terminal is electrically connected to the focus control circuit board through the third conductive member.

7. The lens module of claim 4, wherein each of the elastic pieces comprises two attaching portions and a suspension portion connecting the two attaching portions; the two attaching portions of each of the elastic pieces are respectively attached to one of the anti-shake bracket and the focus bracket, and the suspension portion of each of the elastic pieces is bent and extended between the two attaching portions.

8. An electronic device, comprising a lens module, comprising:
a base provided with an anti-shake control circuit board and a first conductive member;
an elastic suspension component connected to the base; and
a lens component connected to the base through the elastic suspension component, comprising:
an anti-shake bracket connected to the elastic suspension component;
a focus control circuit board arranged on the anti-shake bracket; and
a second conductive member arranged on the anti-shake bracket;
wherein the focus control circuit board is electrically connected to the anti-shake control circuit board through the second conductive member, the elastic suspension component and the first conductive member in sequence;
wherein the anti-shake bracket has an object side and an image side oppositely arranged along a direction of an optical axis, wherein the first conductive member is embedded in the base and close to the object side, and the second conductive member is embedded in the anti-shake bracket and located on the image side;
wherein the focus control circuit board comprises a main body portion attached to the anti-shake bracket and two extending portions bent and extended from edges of the main body portion, and each of the extending portions extends to a surface of the anti-shake bracket on the image side, and is electrically connected to the second conductive member.

9. The electronic device of claim 8, wherein each of the extending portions is electrically connected to two of the second conductive members arranged on the image side, wherein each of the second conductive members comprises a flat portion attached to the extending portion and a plug-in portion integrally arranged with the flat portion, and the plug-in portion of each of the second conductive members is electrically connected to one of the first conductive members close to the object side after being plugged with the elastic suspension component.

10. The electronic device of claim 8, wherein the lens module further comprises:
a focus bracket for fixing a lens; and
a focus coil wound on the focus bracket;
wherein the focus bracket is connected to the anti-shake bracket through an elastic piece component, and the focus coil is electrically connected to the focus control circuit board through the elastic piece component.

11. The electronic device of claim 10, wherein the elastic piece component comprises a plurality of independently arranged elastic pieces, wherein the plurality of the elastic pieces are divided into two groups; one group of the elastic pieces are connected to the anti-shake bracket and the focus bracket on the object side, and the other group of the elastic pieces are connected to the anti-shake bracket and the focus bracket on the image side.

12. The electronic device of claim 11, wherein the focus bracket is provided with a first terminal and a second terminal both electrically connected to the focus coil, wherein the first terminal is protruded from a surface of the focus bracket on the object side, and the second terminal is protruded from the surface of the focus bracket on the image side; the first terminal and the second terminal are respectively arranged through one of the elastic pieces and are electrically connected to the through elastic pieces.

13. The electronic device of claim 12, wherein the anti-shake bracket is provided with a third conductive member, and the third conductive member comprises a connecting portion attached to the elastic piece and an extension portion bent and extended from the connecting portion toward the image side; the extension portion is electrically connected to the focus control circuit board, and the elastic piece electrically connected to the first terminal is electrically connected to the focus control circuit board through the third conductive member.

14. The electronic device of claim 11, wherein each of the elastic pieces comprises two attaching portions and a suspension portion connecting the two attaching portions; the two attaching portions of each of the elastic pieces are respectively attached to one of the anti-shake bracket and the focus bracket, and the suspension portion of each of the elastic pieces is bent and extended between the two attaching portions.

* * * * *